(12) United States Patent
Mendoza

(10) Patent No.: US 11,215,255 B2
(45) Date of Patent: Jan. 4, 2022

(54) TWO-MODE TUNED VIBRATION ABSORBER

(71) Applicant: Textron Aviation Inc., Wichita, KS (US)

(72) Inventor: Gonzalo E. Mendoza, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 67 days.

(21) Appl. No.: 16/521,953

(22) Filed: Jul. 25, 2019

(65) Prior Publication Data
US 2021/0025469 A1    Jan. 28, 2021

(51) Int. Cl.
*F16F 7/10*     (2006.01)
*F16F 7/108*    (2006.01)
*B64C 1/06*     (2006.01)

(52) U.S. Cl.
CPC ............... *F16F 7/108* (2013.01); *B64C 1/06* (2013.01); *F16F 2222/08* (2013.01); *F16F 2224/025* (2013.01); *F16F 2228/066* (2013.01)

(58) Field of Classification Search
CPC . B64C 11/008; F16F 7/10; F16F 7/104; F16F 7/108; F16F 7/116
USPC ................................. 188/378–380; 244/1 N
See application file for complete search history.

(56) References Cited

U.S. PATENT DOCUMENTS

| | | | | |
|---|---|---|---|---|
| 5,687,948 A | * | 11/1997 | Whiteford | F16F 1/3814 248/635 |
| 6,530,562 B1 | * | 3/2003 | Sutton | B60G 11/04 267/36.1 |
| 8,511,601 B2 | * | 8/2013 | Dandaroy | F16F 7/104 244/1 N |
| 2006/0169557 A1 | * | 8/2006 | Goetchius | F16F 9/306 188/378 |
| 2017/0037927 A1 | * | 2/2017 | Buesing | F16F 15/04 |
| 2019/0277364 A1 | * | 9/2019 | Lammi | B64C 11/008 |
| 2020/0173511 A1 | * | 6/2020 | Miller | F16F 7/108 |

* cited by examiner

*Primary Examiner* — Christopher P Schwartz
(74) *Attorney, Agent, or Firm* — Erise IP, P.A.

(57) ABSTRACT

A bimodal tuned vibration absorber includes a first beam arranged lengthwise in a longitudinal direction. The first beam has an attachment mechanism adapted for mechanically coupling the first beam to a structure. A second beam is arranged lengthwise in a transverse direction, perpendicular to the longitudinal direction. The second beam is mechanically coupled to a first end of the first beam via a first connector. A third beam is arranged lengthwise in the transverse direction and is mechanically coupled to a second end of the first beam, opposite the first end, via a second connector. A two-mode tuned vibration absorber includes a first beam aligned longitudinally with a second beam. A connector is aligned longitudinally and disposed between the first beam and the second beam for mechanically coupling the first beam with the second beam. The connector is adapted for enhancing the bending mode of the two-mode tuned vibration absorber.

20 Claims, 6 Drawing Sheets

TWO-MODE TUNED VIBRATION ABSORBER

CROSS-REFERENCE TO RELATED APPLICATIONS

None.

BACKGROUND

1. Field of the Disclosure

Embodiments of this disclosure relate generally to structural vibration mitigation, and more specifically to a tuned vibration absorber (TVA) for propeller-driven aircraft.

2. Description of the Related Art

Many tuned vibration absorbers (TVAs) have been described in the prior art; however, these are generally designed to attenuate vibrations at one particular frequency. U.S. Pat. No. 8,511,601 to Dandaroy et al. discloses an elastomer-type tuned vibration absorber for attenuating a single frequency mode.

SUMMARY

In an embodiment, a bimodal tuned vibration absorber includes a first beam arranged lengthwise in a longitudinal direction. The first beam has an attachment mechanism adapted for mechanically coupling the first beam to a structure. A second beam is arranged lengthwise in a transverse direction, perpendicular to the longitudinal direction. The second beam is mechanically coupled to a first end of the first beam via a first connector. A third beam is arranged lengthwise in the transverse direction. The third beam is mechanically coupled to a second end of the first beam, opposite the first end, via a second connector.

In another embodiment, a two-mode tuned vibration absorber includes a first beam aligned longitudinally with a second beam. A connector is aligned longitudinally and disposed between the first beam and the second beam for mechanically coupling the first beam with the second beam. The connector is adapted for enhancing the bending mode of the two-mode tuned vibration absorber at a first frequency.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Propeller-driven aircraft produce loud noise and vibration at frequencies corresponding to a frequency of the blades of a rotating propeller, known as a blade pass frequency (BPF), and at harmonic frequencies of the BPF. On aircraft having more than one propeller, the propellers typically have the same number of blades and rotate at the same rate such that the propellers have the same BPF. Also, aircraft usually operate at a consistent cruise speed with the same propeller rate. Therefore, the BPF for a given aircraft is usually a consistent and known frequency that may be targeted for vibration reduction of structures of the aircraft.

Embodiments of the present disclosure provide a tuned vibration absorber (TVA) that decreases vibrations at two frequencies (e.g., at the BPF and at one harmonic frequency of the BPF). The TVA is mounted to a structure, and vibration of the TVA is tuned to counteract vibrations of the structure. By vibrating at two modes, the TVA "absorbs" (i.e., reduces) vibrations of the structure corresponding to frequencies of the two modes.

Generally, a bending mode type of TVA includes a mass (e.g., a weight) on the end of a beam. The beam dimensions and material, as well as the amount and position of a mass attached to the end of the beam, together determine a natural frequency at which bending of the beam resonates.

In some embodiments, the TVA may be adapted to reduce vibration at the BPF, and at a harmonic frequency of the BPF that dominates the acoustic spectra (together with the BPF), for a particular propeller aircraft. In certain embodiments, the TVA may be adapted to reduce vibration for different combinations of the BPF with various harmonic tones (e.g., by adjusting the amount and position of masses coupled to a beam of the TVA, as described below). In some embodiments, the TVA is adapted for reducing vibration at other low frequency tones (e.g., at frequencies not necessarily associated with a BPF). In other embodiments, the TVA is adapted for reducing vibration at BPF frequencies during different regimes of flight. For example, the TVA may be adapted to provide noise and vibration reduction during the climb and cruise phases of flight, or during both long range and high-speed cruise (e.g., situations where different propeller rotational speeds are used).

Figure 1:
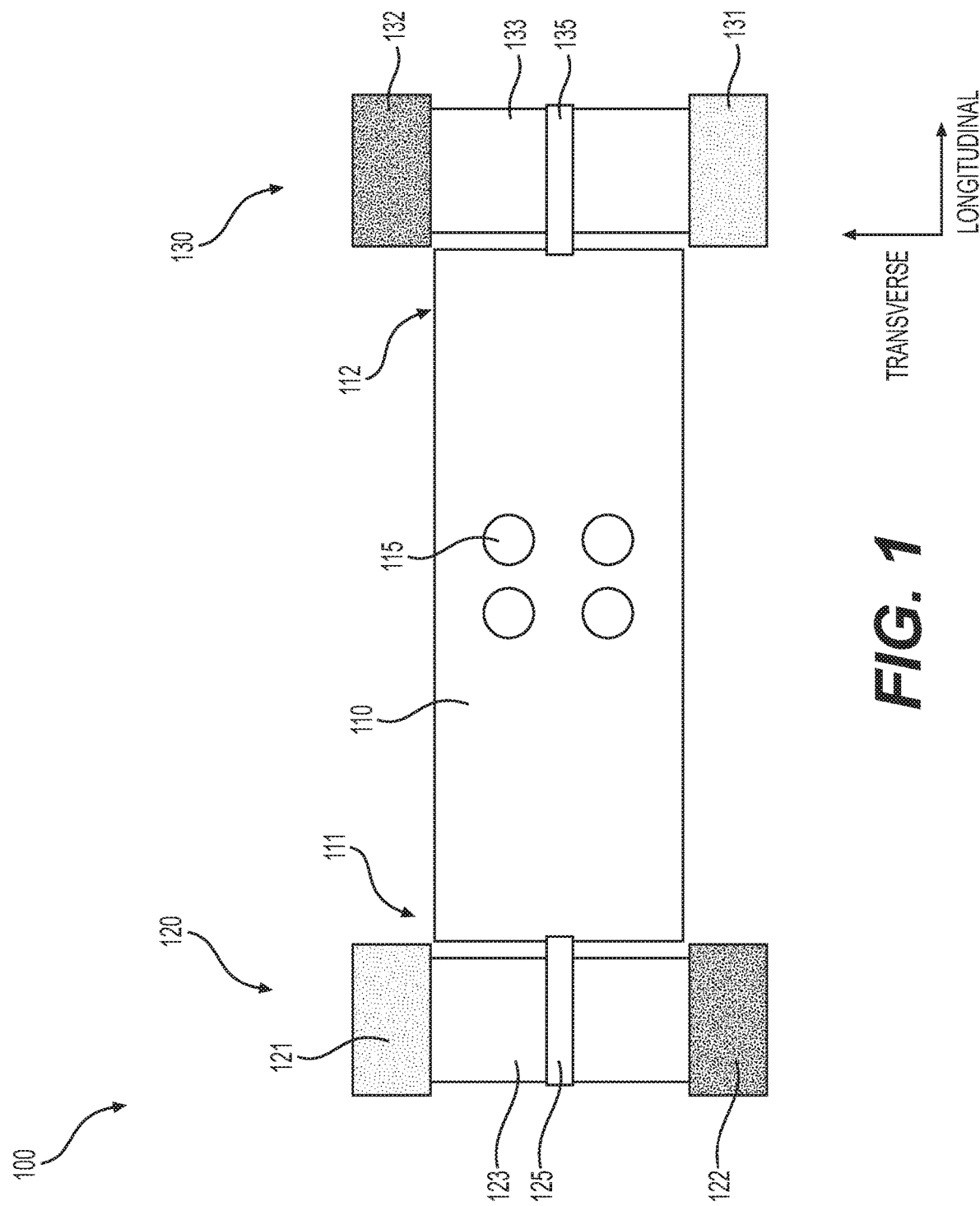
FIG. 1 is a top-down view of a two-mode tuned vibration absorber (TVA), in an embodiment.

FIG. 1 is a top-down view of a two-mode TVA 100. TVA 100 provides bimodal vibrations including a bending mode vibration at a primary frequency and a torsional mode vibration at a secondary frequency for reducing vibrations of a structure at the primary and secondary frequencies, respectively. The bending mode is characterized by bending of a beam 110 lengthwise in a longitudinal direction. The torsion mode is characterized by twisting of beam 110 around a longitudinal axis of the beam. In the example of a propeller-driven aircraft, the primary frequency is substantially matched with the BPF and the secondary frequency is substantially matched with a harmonic of the BPF.

Attachment mechanism 115 is for an example a component or a group of components adapted to enable a portion of TVA 100 to be mounted to a structure (not shown) for reducing vibrations of the structure. In a propeller-driven aircraft, the structure may include but is not limited to frames, stringers, skin portions, engine beam mounts, rudder pedals, and heads-up display (HUD) assemblies. Examples of attachment mechanism components include rivets, bolts, welding, clamps, and brackets, etc. Attachment mechanism 115 enables a mechanical coupling of beam 110 to the structure while allowing portions of the beam to flex or bend. In certain embodiments, attachment mechanism 115 is located substantially near the middle of beam 110.

A second TVA 120 and a third TVA 130 are located at opposite ends of beam 110, as depicted in FIG. 1. The second TVA 120 and third TVA 130 are aligned lengthwise in a transverse direction, perpendicular to the longitudinal direction as depicted in FIG. 1. The second TVA 120 and the third TVA 130 are used as mass components of first TVA 100. Each of the TVAs 110, 120, 130 include a beam, an attachment means positioned substantially near the middle of each beam, and a pair of masses positioned substantially near the ends of each beam. In the case of TVA 100, the pair of masses positioned substantially near the ends of beam 110 are second TVA 120 and third TVA 130.

Specifically, second TVA 120 includes a first mass 121 located at or near one end of a beam 123, and a second mass 122 located at or near the opposite end of beam 123. Likewise, third TVA 130 includes a third mass 131 located at or near one end of a beam 133, and a fourth mass 132 located at or near the opposite end of beam 133. In certain embodiments, the attachment means for second TVA 120 is a connector 125 that mechanically couples beam 123 to a first end 111 of beam 110, and the attachment means for third TVA 130 is a connector 135 that mechanically couples beam 133 to a second end 112 of beam 110, opposite first end 111.

In operation, when a structure vibrates, the vibration is coupled to TVA 100 via attachment mechanism 115 causing TVA 100 to vibrate. Based on properties of beam 110 (e.g., cross-sectional area, material, length) and masses attached to the beams (e.g., second TVA 120 and second TVA 130), TVA 100 vibrates according to a primary bending mode (i.e., a bending mode along the longitudinal axis at a primary frequency). Vibration from TVA 100 is translated to second TVA 120 and third TVA 130, which excites a bending mode along beam 123 and beam 133, respectively (i.e., along the transverse direction, as depicted in FIG. 1).

In certain embodiments, the masses attached to beams 123, 133 are unevenly distributed. For example, first mass 121 is unequal to second mass 122 on beam 123, and third mass 131 is unequal to fourth mass 132 on beam 133. The uneven distribution of mass may be provided in a variety of ways, including but not limited to using objects of uneven shape or uneven density, or by forming a mass from a subset of smaller masses that are unevenly distributed (e.g., in number, size, density, and/or location).

In some embodiments, first mass 121 and third mass 131 are equal to each other, and second mass 122 and fourth mass 132 are equal to each other, such that equal masses are arranged in an opposing manner on their respective beams. In other words, masses 121, 131 are equal and disposed on opposite ends of their respective beams in the transverse direction. Likewise, masses 122, 132 are equal and disposed on opposite ends of their respective beams in the transverse direction. This arrangement provides bending modes of second TVA 120 and third TVA 130 at the same frequency. Due to the arrangement of masses 121, 131 anti-symmetrically with masses 122, 132, second TVA 120 twists anti-symmetrically (e.g., with a phase difference of π radians) with third TVA 130, which induces a torsion mode in beam 110 at a secondary frequency. In other words, the matched pairs of unevenly distributed masses on second TVA 120 and third TVA 130 are adapted to produce a torsion mode vibration of beam 110 at the secondary frequency due to excitation from the bending mode vibration of beam 110 at the primary frequency.

Since the torsion mode is predominately determined by the cross-section of beam 110, the cross-sectional dimensions of beam 110 are adapted to provide the torsional mode at the secondary frequency based on excitation from the bending mode vibration of beam 110 at the primary frequency. Thus, beam 110 may be adapted to provide both a torsion mode and a bending mode at different frequencies.

In some embodiments, first masses 121, 131 and second masses 122, 132 are equivalent in amount and position such that second TVA 220 and third TVA 230 each vibrate at the same frequency (e.g., the secondary frequency). In this case, a torsion mode is not induced in the beam 110. Instead, second TVA 120 and third TVA 130 effectively serve as a dead mass with respect to TVA 100 at their respective ends of beam 110, which allows the bending mode of TVA 100 to be tuned to the primary frequency (e.g., the BPF) while the bending mode of second TVA 120 and third TVA 130 are simultaneously tuned to the secondary frequency (e.g., a harmonic of the BPF).

In the example of a propeller-driven aircraft, the primary frequency is substantially matched with the BPF and the secondary frequency is substantially matched with a dominant harmonic of the BPF.

The bending mode frequency of TVA 100 may be adjusted by moving second TVA 120 and third TVA 130 closer to, or further away from, the middle of first beam 110 along its longitudinal axis. For example, moving second TVA 120 and third TVA 130 closer to the middle of first beam 110 (e.g., towards attachment mechanism 115) provides a higher frequency vibration. Conversely, moving second TVA 120 and third TVA 130 further away from the middle of first beam 110 provides a lower frequency vibration. Likewise, first and second masses 121, 122 may be closer to, or further away from, the middle of beam 123 for tuning second TVA 120. Similarly, first and second masses 131, 132 may be moved closer to, or further away from, the middle of beam 133 for tuning third TVA 130.

Modifications to the beams of TVAs may be made to tune the primary and secondary frequencies. For example, modifications to the shape of beam 110 may be used to adjust the primary and/or secondary frequencies. Exemplary shape modifications include cutouts of material from the beam, additive material disposed on the beam, and variations in cross-section of the beam along its length. These modifications may be used adjust the response of the beam in torsion or bending, such as altering a ratio of torsional stiffness to bending stiffness, which may for example be used to alter the secondary frequency with respect to the primary frequency. Modifications of the beams may be combined in any form to establish target bending and torsion frequencies and/or to decouple the bending and torsion modes. The modifications may be combined with other features, such as elastomeric material or rotational springs as further described below, to tune and/or decouple the bending and torsion modes. Shape modifications to the beam may be used to enable TVA 100 to operate in geometrically constrained environments. For example, beam 110 may be short in the transverse direction, but relatively thick (e.g., being thicker than wider in the transverse direction) to maintain a desired longitudinal length (e.g., to clear other features of the structure or to maintain a desired combination of high bending frequency and high effective mass).

In certain embodiments, modifications to the shape of beam 110 include providing additional materials (e.g., "doublers") to increase the thickness and hence overall stiffness of the beam. For example, doublers may be formed symmetrically about the longitudinal axis of beam 110 for altering the torsional and bending stiffness of the beam 110. A doubler increases the bending stiffness of the beam along its longitudinal axis without a commensurate increase in the torsional frequency.

TVA 100 provides a dual-frequency vibration-reduction apparatus for attenuating low frequency vibrations (e.g., <1 kHz) on any structure needing vibration reduction at two frequencies, which is particularly prevalent in propeller aircraft and helicopters. Advantages of TVA 100 include that it is simple to tune for reducing vibrations at the primary and secondary frequencies and may be adjusted for treating many different frequency vibration problems, such as the BPF and the first harmonic, the BPF and the second harmonic, the BPF and the third harmonic, etc. By modifying masses 121, 122, 131, 132, and their positions, and by modifying positions of second TVA 120 and third TVA 130, TVA 100 may be tuned to a wide range of frequencies (e.g., from about 20 Hz to about 500 Hz). Additionally, modifications to beams 110, 123, 133 such as the use of cutouts and doublers enables the same TVA design to be used on a variety of structures and at a variety of locations for increasing the effectiveness of attenuating structural vibration. In certain embodiments, the primary frequency range is from about 20 Hz to about 200 Hz and the overall frequency range (first and second frequencies) is from about 20 Hz to about 500 Hz. In some embodiments, the primary frequency range is from about 28 Hz to about 150 Hz and the overall frequency range is from about 28 Hz to about 450 Hz.

In certain embodiments, two of TVA 100 are mounted as a pair on opposing sides of a structure via attachment mechanism 115. An example structure is an aircraft frame. Mounting TVA 100 in pairs assists with preventing torsion loads being imposed on the structure (e.g., frame). Alternatively, a single TVA 100 may be mounted to the frame with a frame stiffener mounted to the opposite side of the frame.

Connectors 125, 135 may be adapted for tuning TVA 100 to a desired secondary frequency without altering the primary frequency. In certain embodiments, connectors 125, 135 are tuned downward (e.g., to a lower frequency) without extending the masses (e.g., TVA 120, 130) further apart and without increasing the amount of masses 121, 122. For example, the length of beam 110 may be constrained by available space, which limits how far apart the masses can be located. Therefore, a desired vibrational frequency may be attained with a limited beam length by adapting connectors 125, 135 as further described below in connection with FIG. 2.

Figure 2:
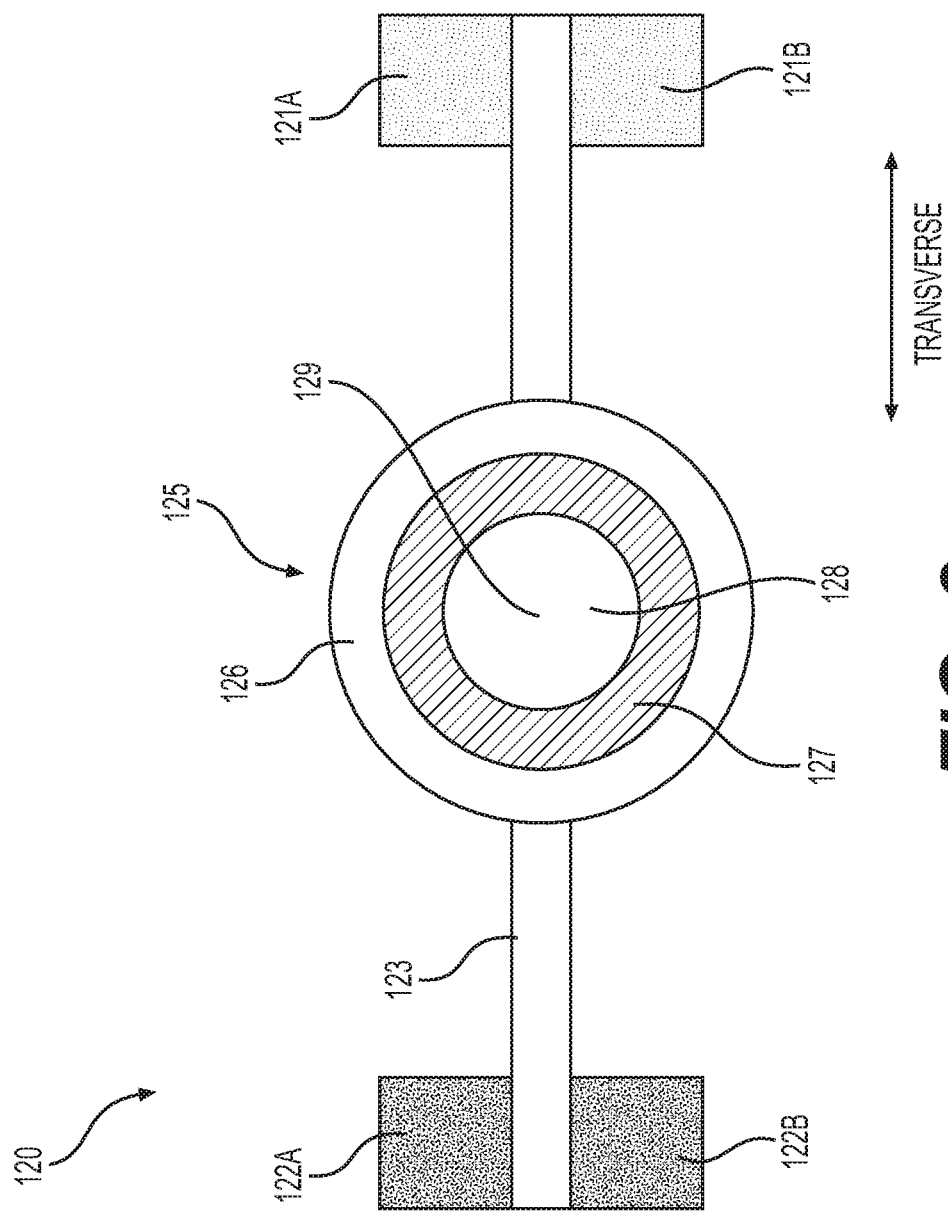
FIG. 2 is a cross-sectional side view of the two-mode TVA of FIG. 1.

FIG. 2 is a cross-sectional side view of second TVA 120 of FIG. 1. The drawing of FIG. 2 is not to scale. In certain embodiments, the masses are located on both the top and bottom of beam 123. However, the masses may be configured in any number of sub-masses attached to any portion of beam 123 without departing from the scope hereof. As depicted in FIG. 2, first mass 121 has an upper portion 121A and a matching lower portion 121B. Similarly, second mass 122 has an upper portion 122A and a matching lower portion 122B. In some embodiments, the mass of each upper portion is equal to the matching lower portion, respectively.

Connector 125 may be comprised of three portions arranged concentrically: an outer portion 126, a middle portion 127, and an inner portion 128. The materials used for the outer, middle, and inner portions 126, 127, 128 are selected to control the overall stiffness of the TVA. In certain embodiments, the middle portion 127 is less stiff than the inner and outer portions 128, 126, which allows a greater twisting rotation about a central axis 129 of connector 125 for a given amount of torque produced by masses 121, 122. For example, middle portion 127 may include an elastomeric material or a mechanical rotation spring. Having a less stiff middle portion 127 enables the same or a greater twisting rotation about central axis 129 despite a shorter length of beam 123 and/or a reduced amount of masses 121, 122. Connector 135 may similarly include outer, middle, and inner portions (not shown) for controlling the overall stiffness of the TVA.

Exemplary elastomeric materials used in middle portion 127 include elastomeric springs, rubber or other viscoelastic polymers that are shaped into hollow tubes or rings which may be attached using pressure or adhesives to the inner and outer portions 126, 128. Alternatively, in some embodiments, middle portion 127 may include a mechanical rotation spring. Exemplary mechanical rotation springs include a twisted steel wire wrapped cylindrically around the inner portion 126 with one end mechanically coupled to inner portion 126 and the other end mechanically coupled to outer portion 128. Another example is a length of steel sheet wrapped concentrically (e.g., like a roll of tape) with ends of the sheet mechanically coupled to inner portion 126 and outer portion 128.

Advantages of using an elastomeric material or a mechanical rotation spring in connectors 125, 135 is that it lowers the frequency of the torsion mode of TVA 100 without affecting the bending mode of TVA 100. Additionally, widening of the masses in the transverse direction is not needed, which is advantageous for using TVA 100 in confined space settings.

Figure 3:
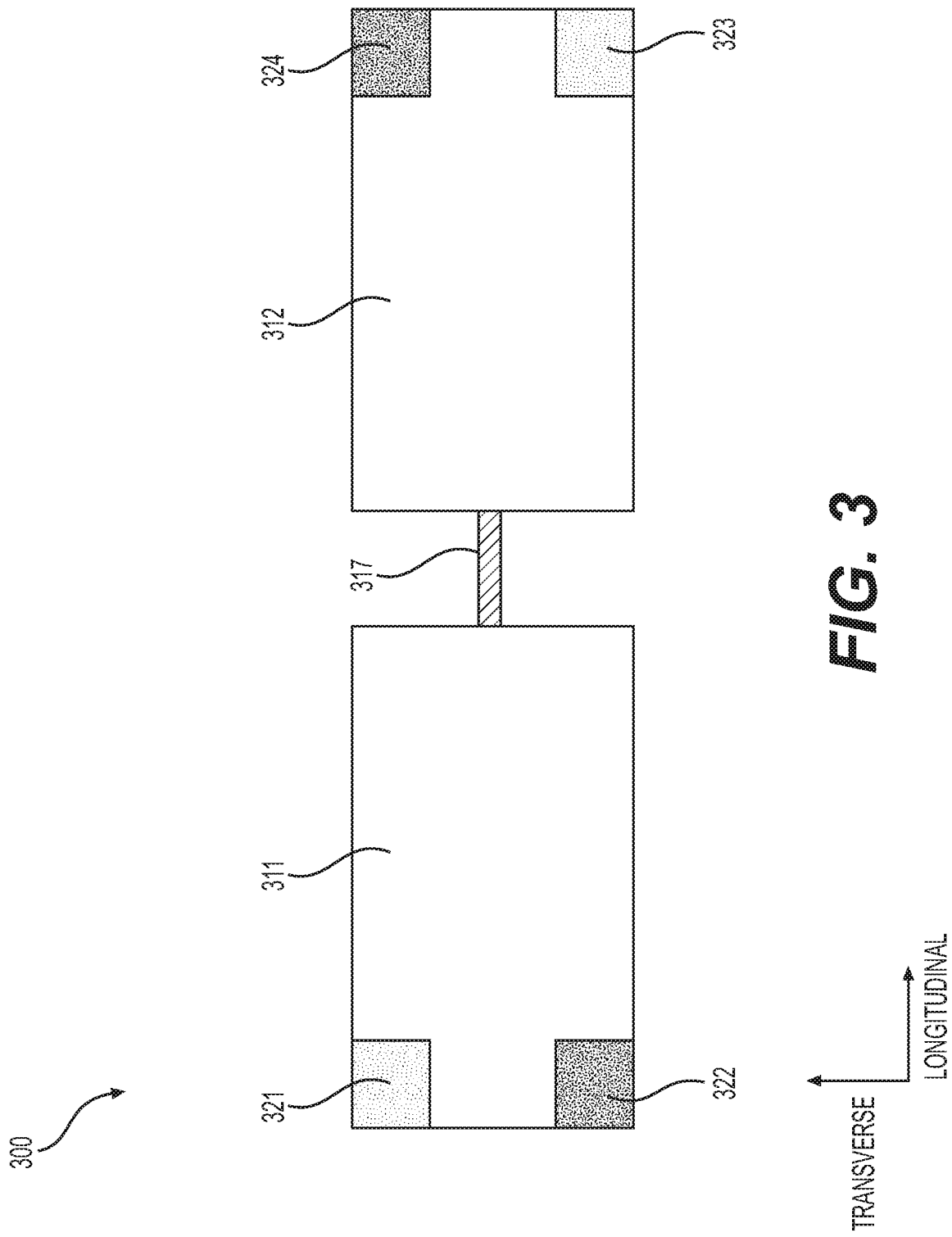
FIG. 3 is a top-down view of a rotational spring TVA, in an embodiment.

FIG. 3 is a top-down view of another embodiment of a rotational spring TVA 300. A first beam 311 is separated from a second beam 312 by a connector 317. Connector 317 may be adapted for enhancing the bending mode of TVA 300. For example, connector 317 may be formed of a different material (e.g., to provide a different resonant frequency) compared to first beam 311 and second beam 312. In the arrangement depicted in FIG. 3, first beam 311 and connector 317 act like two springs aligned in series, which may be used to adapt TVA 300 to vibrate at certain desirable frequencies. For example, a lower frequency bending mode vibration may be achieved for TVA 300 without requiring a larger distance between masses along the longitudinal direction and without requiring a larger amount of masses.

In certain embodiments, connector 317 is a "tuned torsional beam". An exemplary tuned torsional beam is a hollow tube having a diameter and/or material properties adapted for tuning the torsional frequency of the TVA. In some embodiments, connector 317 has variable stiffness along its length. Variable stiffness may be achieved by tapering the wall thickness of the hollow tube or through discrete changes in the composition of connector 317. Variable stiffness may be used to allow for "blunting" of non-linear behavior (e.g., under conditions having large deflections) or as a means for tuning the overall response. For example, connector 317 may be predominately very stiff with a small portion (e.g., at the middle of the connector) to be softer through a change in material properties or by replacing the small portion with a torsional spring.

Figure 4:
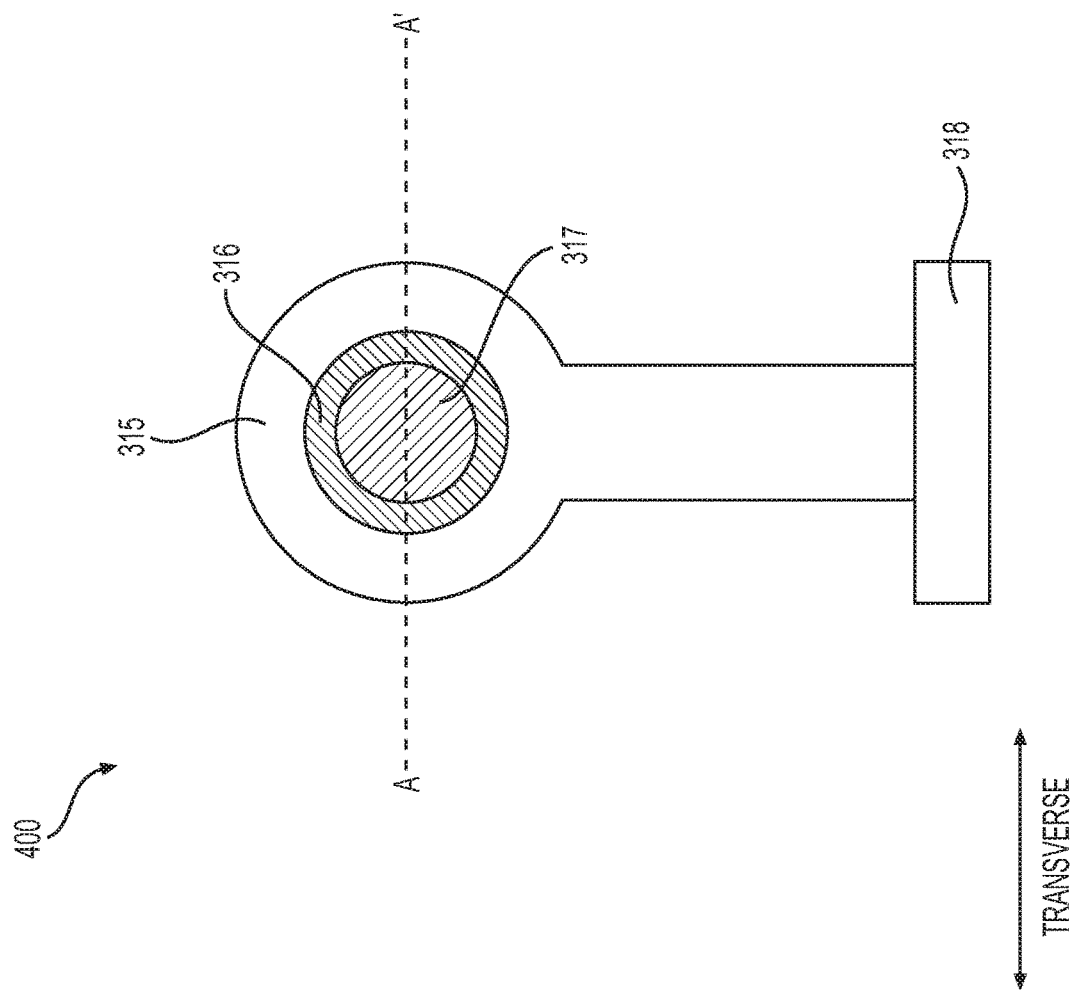
FIG. 4 is a cross-sectional side view of a mounting structure for the rotational spring TVA of FIG. 3.
Figure 5:
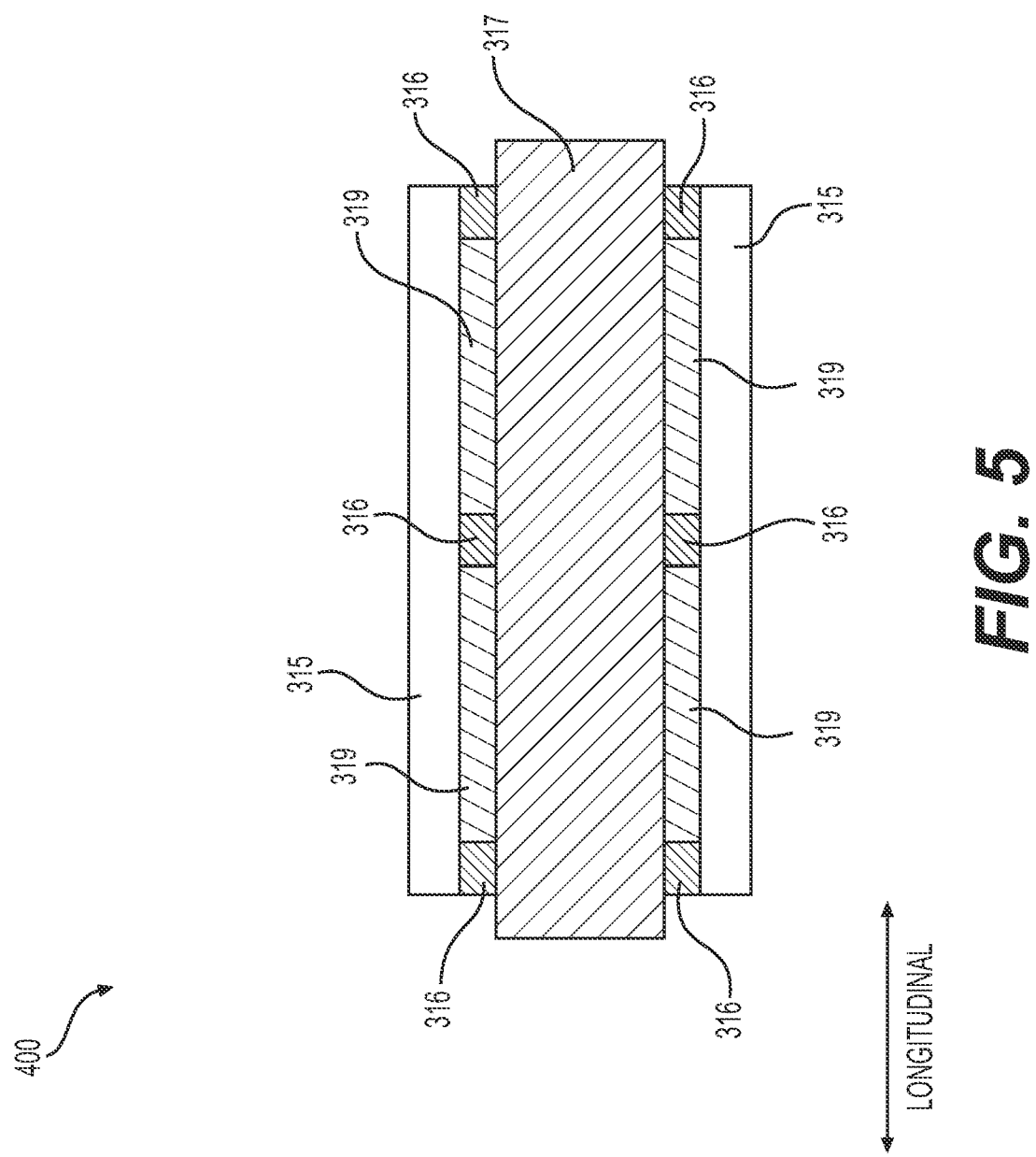
FIG. 5 is a cross-sectional top-down view of the mounting structure of FIG. 4.

Connector 317 is mechanically coupled to a structure for reducing vibration of the structure via a separate component (not shown in FIG. 3), for example via an attachment 400 as depicted in FIGS. 4 and 5 and further described below.

As depicted in FIG. 3, a first mass 321 and a second mass 322 are shown attached to first beam 311, and a third mass 323 and a fourth mass 324 are shown attached to second beam 312. The masses may be adapted for tuning a bending mode frequency of TVA 300. In certain embodiments, first and third masses 321, 323 are substantially equivalent, and second and fourth masses 322, 324 are substantially equivalent; however, first and second masses 321, 322 are unequal, and third and fourth masses 323, 324 are unequal. In other words, pairs of equivalent masses may be arranged anti-symmetrically to excite a torsional mode vibration of TVA 300.

FIG. 4 is a cross-sectional side view of attachment 400 for the rotational spring TVA 300 of FIG. 3. Connector 317 of TVA 300, FIG. 3 is disposed concentrically within a stand 315, as depicted in FIG. 4. Stand 315 includes a hollow cylindrical portion adapted for receiving connector 317. Between stand 315 and connector 317 are a plurality of bearings 316, which are best viewed in the top-down view of FIG. 5. Bearings 316 are arranged concentrically within the hollow cylindrical portion of the stand 315 and adjacent the connector 317 for facilitating a smooth twisting rotation of connector 317 within stand 315. Stand 315 may optionally include a base 318 for mechanically coupling to a structure (not shown).

FIG. 5 is a cross-sectional top-down view of the mounting structure of FIG. 4. The cross-section shown in FIG. 5 is along line A-A' depicted in FIG. 4. The plurality of bearings 316 may be positioned in a plurality of positions along the longitudinal axis, for example, as depicted in FIG. 5. The number of bearings 316 is adapted to ensure that a deflection under load does not impede a smooth twisting rotation of connector 317.

A plurality of soft rotational springs or elastomers 319 may be disposed between bearings 316 and concentrically arranged around connector 317 within stand 315 to ensure the TVA is biased in a desired orientation. Bearings 316 enable connector 317 to twist freely, while soft elastomers/springs 319 are adapted to return connector 317 to its original position to maintain the desired orientation. For example, the springs or elastomers may be pre-set to provide the desired orientation of the TVA with respect to its base 315. In the event that external loads on the attached structure are translated to the TVA, thereby causing motion of the TVA, the soft elastomers/springs 319 return connector 317 to the desired orientation.

Figure 6:
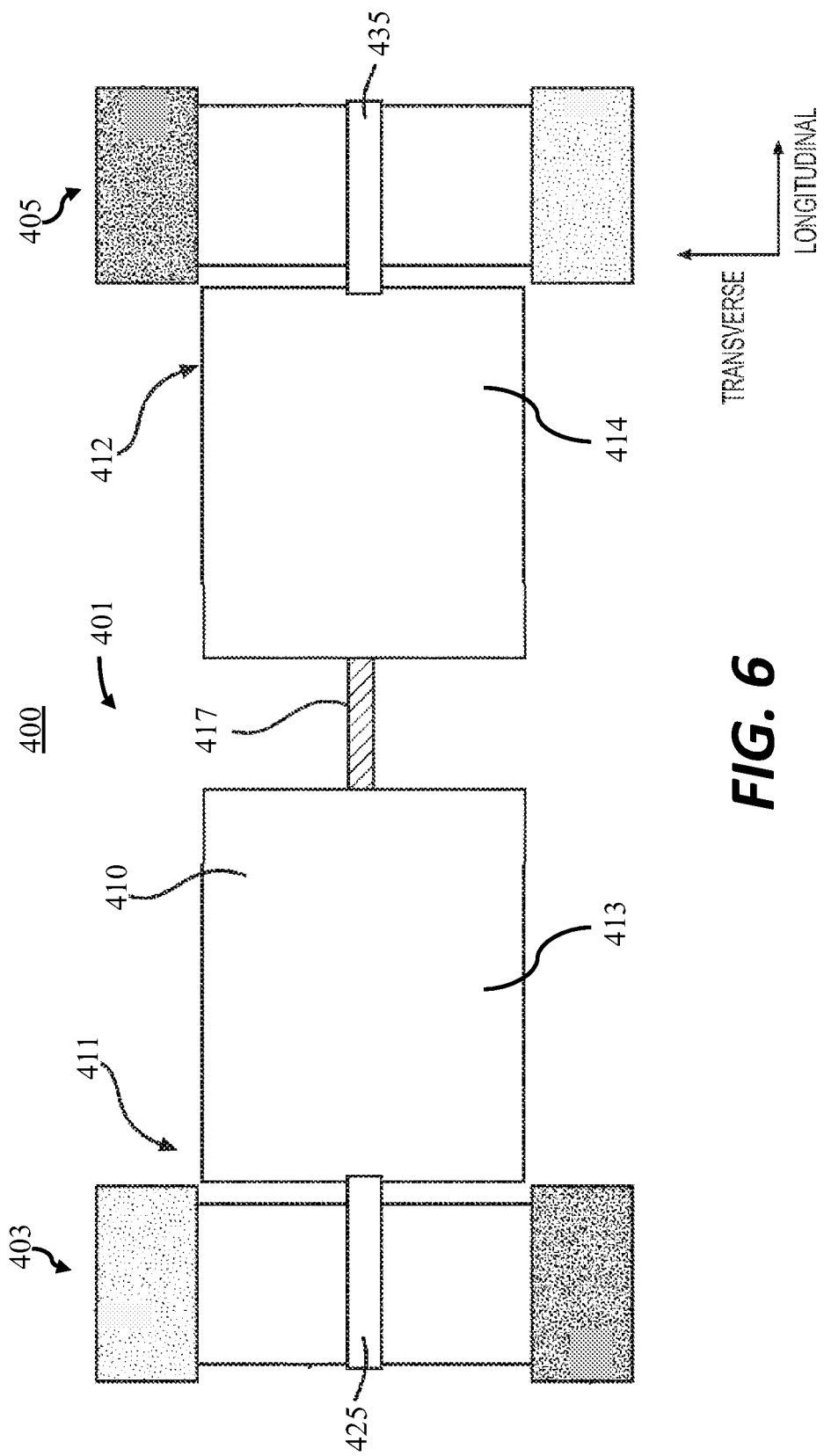
FIG. 6 is a top-down view of a combination TVA comprised of TVAs of FIGS. 1 and 3, in an embodiment.

A combination TVA 400, shown in FIG. 6, incorporates features of TVA 100 in combination with features of TVA 300. Specifically, in certain embodiments, connector 417 of TVA 300 is incorporated within beam 410 of TVA 100, which combines the functions of TVA 100 while enabling adjustments to the desired orientation of the TVA's longitudinal bending action with respect to base 318 (e.g., a nominal orientation to the plane of the TVA). Alternatively, base 318 may be adapted to provide a similar adjustability to the orientation of the combination TVA 400. In other words, the combination TVA 400 forms a primary TVA 401 having a secondary TVA 403 mechanically coupled to a first end 411 of the first beam 413 via a second connector 425, and a tertiary TVA 405 mechanically coupled to a first end 412 of the second beam 414 via a third connector 435, such that the secondary TVA 403 and the tertiary TVA 405 serve as masses for the primary TVA 401.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims.

The invention claimed is:

1. A bimodal tuned vibration absorber, comprising:
   a first beam arranged lengthwise in a longitudinal direction, the first beam having an attachment mechanism adapted for mechanically coupling the first beam to a structure;
   a second beam arranged lengthwise in a transverse direction, perpendicular to the longitudinal direction, the second beam being mechanically coupled to a first end of the first beam via a first connector; and
   a third beam arranged lengthwise in the transverse direction, the third beam being mechanically coupled to a second end of the first beam, opposite the first end, via a second connector.

2. The bimodal tuned vibration absorber of claim 1, comprising:
   the second beam having a first mass at a first end of the second beam and a second mass at a second end of the second beam, opposite the first end; and
   the third beam having a third mass at a first end of the third beam and a fourth mass at a second end of the third beam, opposite the first end.

3. The bimodal tuned vibration absorber of claim 2, wherein:
   the second beam, the first mass, and the second mass are adapted to form a second tuned vibration absorber; and
   the third beam, the third mass, and the fourth mass are adapted to form a third tuned vibration absorber.

4. The bimodal tuned vibration absorber of claim 2, wherein the bimodal tuned vibration absorber is adapted for damping vibrations of the structure at a primary frequency via a bending mode vibration of the first beam, and at a secondary frequency via bending mode vibrations of the second beam and the third beam.

5. The bimodal tuned vibration absorber of claim 4, wherein:
   the first mass is unequal to the second mass, and the third mass is unequal to the fourth mass; and
   the first mass is substantially equal to the third mass and the second mass is substantially equal to the fourth mass such that equivalent masses are arranged on opposite ends of the second beam and the third beam, respectively.

6. The bimodal tuned vibration absorber of claim 5, wherein equivalent masses arranged on opposite ends of the second beam and the third beam, respectively, provide anti-symmetrical bending modes for the second beam and the third beam, thereby inducing a torsional mode vibration of the first beam.

7. The bimodal tuned vibration absorber of claim 6, wherein the bimodal tuned vibration absorber is adapted for damping vibrations of the structure at a primary frequency via the bending mode vibration of the first beam, and at a secondary frequency via the torsional mode vibration of the first beam, for reducing vibrations of the structure at the primary and secondary frequencies, respectively.

8. The bimodal tuned vibration absorber of claim 1, further comprising shape modifications to the first beam to alter a ratio of torsional stiffness to bending stiffness, wherein the shape modifications include one or more of a) cutouts of material from the beam, b) additive material disposed on the beam, or c) variations in cross-section of the beam along its length.

9. The bimodal tuned vibration absorber of claim 1, wherein the first connector and the second connector are adapted for tuning the bimodal tuned vibration absorber to a desired secondary frequency without altering the primary bending mode frequency.

10. The bimodal tuned vibration absorber of claim 9, wherein the first connector and the second connector each include three concentrically arranged portions such that a desired overall stiffness of the bimodal tuned vibration absorber is provided.

11. The bimodal tuned vibration absorber of claim 10, wherein the three concentrically arranged portions comprise an outer portion, a middle portion, and an inner portion, the middle portion being adapted to be less stiff than the outer portion and the inner portion for allowing an increased amount of twisting rotation.

12. The bimodal tuned vibration absorber of claim 11, wherein the middle portion is made of an elastomeric material or a mechanical rotation spring.

13. A two-mode tuned vibration absorber, comprising:
a first beam aligned longitudinally with a second beam;
a connector aligned longitudinally and disposed between the first beam and the second beam for mechanically coupling the first beam with the second beam,
wherein the connector is adapted for enhancing a bending mode vibration of the two-mode tuned vibration absorber at a first frequency in a longitudinal direction; and
a stand comprising a hollow cylindrical portion adapted for receiving the connector, wherein the stand is adapted to enable a twisting rotation of the connector within the stand for enhancing a torsional mode vibration of the two-mode tuned vibration absorber at a second frequency in a torsional direction.

14. The two-mode tuned vibration absorber of claim 13, wherein the connector is a tuned torsional beam having a diameter and material properties adapted for tuning a torsional frequency of the two-mode tuned vibration absorber.

15. The two-mode tuned vibration absorber of claim 13, wherein the connector has variable stiffness along the longitudinal direction.

16. The two-mode tuned vibration absorber of claim 13, further comprising:
a first mass and a second mass disposed at a first end of the first beam, opposite the connector;
a third mass and a fourth mass disposed at a first end of the second beam, opposite the connector;
the first mass is equivalent to the third mass and the second mass is equivalent to the fourth mass, the first mass being unequal with the second mass and the third mass being unequal with the fourth mass such that the torsional mode vibration of two-mode tuned vibration absorber is excited at the second frequency, different from the first frequency.

17. The two-mode tuned vibration absorber of claim 13, wherein the two-mode tuned vibration absorber forms a primary tuned vibration absorber further comprising:
a secondary tuned vibration absorber mechanically coupled to a first end of the first beam via a second connector; and
a tertiary tuned vibration absorber mechanically coupled to a first end of the second beam via a third connector, such that the secondary tuned vibration absorber and the tertiary tuned vibration absorber serve as masses for the primary tuned vibration absorber.

18. A two-mode tuned vibration absorber, comprising:
a first beam aligned longitudinally with a second beam; and
a connector aligned longitudinally and disposed between the first beam and the second beam for mechanically coupling the first beam with the second beam,
wherein the connector is adapted for enhancing a bending mode vibration of the two-mode tuned vibration absorber at a first frequency; and
wherein the connector is disposed concentrically within a stand,
wherein the stand comprises a hollow cylindrical portion adapted for receiving the connector, the stand being mechanically coupled with a structure for damping vibration of the structure at the first frequency and a second frequency.

19. The two-mode tuned vibration absorber of claim 18, further comprising a plurality of bearings disposed concentrically within the hollow cylindrical portion of the stand and adjacent the connector for enabling a smooth twisting rotation of the connector within the stand.

20. The two-mode tuned vibration absorber of claim 18, wherein a plurality of soft rotational springs or elastomers are disposed between a plurality of bearings concentrically around the connector and within the hollow cylindrical portion of the stand, the soft rotational springs or elastomers being adapted to return the connector to its original position to maintain a desired orientation of the two-mode tuned vibration absorber following twisting of the connector.

* * * * *